US008303398B2

(12) United States Patent
Canterbury et al.

(10) Patent No.: US 8,303,398 B2

(45) Date of Patent: Nov. 6, 2012

(54) DYNAMIC POWER MANAGEMENT IN A GAMING MACHINE

(75) Inventors: Stephen A. Canterbury, Antioch, IL (US); Victor Mercado, Berwyn, IL (US)

(73) Assignee: WMS Gaming Inc., Waukegan, IL (US)

( * ) Notice: Subject to any disclaimer, the term of this patent is extended or adjusted under 35 U.S.C. 154(b) by 56 days.

(21) Appl. No.: 12/871,364

(22) Filed: Aug. 30, 2010

(65) Prior Publication Data

US 2010/0323774 A1 Dec. 23, 2010

Related U.S. Application Data

(63) Continuation of application No. 11/996,053, filed as application No. PCT/US2006/028626 on Jul. 21, 2006, now Pat. No. 7,785,192.

(60) Provisional application No. 60/701,272, filed on Jul. 21, 2005.

(51) Int. Cl.
*A63F 13/12* (2006.01)

(52) U.S. Cl. .................. 463/24; 463/1; 463/16; 463/20; 273/138.2; 273/139; 273/141 A; 273/460; 345/212; 348/607; 348/705; 455/134; 455/136; 455/140; 455/226.2

(58) Field of Classification Search .................... 463/16, 463/20, 22–23, 30–34, 40, 42–43; 273/108.1, 273/138.2, 139, 141 A, 142 R, 143 C, 142 B, 273/142 H, 317.1, 460–461; 345/1.1, 11, 345/14, 204, 211–213; 348/553, 559–560, 348/563, 567–568, 607–624, 634–637, 704–706, 348/731–732; 455/41.2, 134, 136, 138, 140, 455/151.2, 153.2, 226.2, 420, 512–513; *A63F 13/12*
See application file for complete search history.

(56) References Cited

U.S. PATENT DOCUMENTS

| | | | | |
|---|---|---|---|---|
| 6,146,274 | A * | 11/2000 | Salour et al. | 463/29 |
| 6,193,608 | B1 | 2/2001 | Walker et al. | |
| 6,804,763 | B1 * | 10/2004 | Stockdale et al. | 711/170 |
| 7,228,242 | B2 * | 6/2007 | Read et al. | 702/57 |
| 7,637,816 | B2 * | 12/2009 | Canterbury et al. | 463/47 |
| 7,722,468 | B2 * | 5/2010 | Cockerille et al. | 463/43 |
| 7,785,192 | B2 | 8/2010 | Canterbury et al. | |
| 2003/0096650 | A1 | 5/2003 | Eguchi et al. | |

(Continued)

FOREIGN PATENT DOCUMENTS

| | | |
|---|---|---|
| WO | WO-2007014135 A2 | 2/2007 |
| WO | WO-2007014135 A3 | 2/2007 |

OTHER PUBLICATIONS

"U.S. Appl. No. 11/996,053 Final Office Action Mailed Jul. 24, 2009", 9 pgs.

(Continued)

*Primary Examiner* — Arthur O. Hall

(74) *Attorney, Agent, or Firm* — Schwegman Lundberg & Woessner, P.A.

(57) ABSTRACT

A gaming machine for conducting a wagering game includes a value input device for receiving a wager and a processor for executing gameplay on the gaming machine. The processor has a plurality of power consumption levels. A power regulator is operative to alter the power consumption level of the processor amongst the plurality of power consumption levels. In an embodiment, the power regulator comprises application software stored on a memory device in communication with the processor.

14 Claims, 3 Drawing Sheets

U.S. PATENT DOCUMENTS

| | | | | |
|---|---|---|---|---|
| 2003/0144051 | A1 | 7/2003 | Gauselmann | |
| 2003/0228906 | A1 | 12/2003 | Walker et al. | |
| 2006/0035590 | A1 * | 2/2006 | Morris et al. | 455/41.2 |
| 2006/0205513 | A1 * | 9/2006 | Breckner et al. | 463/43 |
| 2008/0220858 | A1 | 9/2008 | Canterbury et al. | |
| 2009/0149261 | A1 | 6/2009 | Chen et al. | |

OTHER PUBLICATIONS

"U.S. Appl. No. 11/996,053 Non-Final Office Action mailed Oct. 16, 2008", 6 pgs.

"U.S. Appl. No. 11/996,053, Notice of Allowance mailed Apr. 22, 2010", 5 pgs.

"U.S. Appl. No. 11/996,053, Response filed Apr. 16, 2009 to Non Final Office Action mailed Oct. 16, 2008", 7 pgs.

"U.S. Appl. No. 11/996,053, Response filed Nov. 24, 2009 to Final Office Action mailed Jul. 24, 2009", 16 pgs.

"International Application Serial No. PCT/US2006/028626, International Search Report ,mailed on May 29, 2008", 4 pgs.

"International Application Serial. No. PCT/US2006/028626, International Written Opinion, mailed on May 29, 2008", 6 pgs.

* cited by examiner

DYNAMIC POWER MANAGEMENT IN A GAMING MACHINE

RELATED APPLICATIONS

This application is a continuation of U.S. patent application Ser. No. 11/996,053, filed Jan. 17, 2008, now issued as U.S. Pat. No. 7,785,192, which is a U.S. National Stage Filing under 35 U.S.C. 371 from International Patent Application Serial No. PCT/US2006/028626, filed Jul. 21, 2006, and published on Feb. 1, 2007 as WO 2007/014135 A2, which claims the priority benefit of U.S. Provisional Application Ser. No. 60/701,272 filed Jul. 21, 2005, the contents of which are incorporated herein by reference in their entireties.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2005, 2006, WMS Gaming, Inc.

FIELD

The disclosure relates generally to gaming machines, and methods for playing wagering games, and more particularly, to a gaming machine having dynamic power consumption management.

BACKGROUND

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Gaming machines utilize processors to control the operation of the gaming machine, including game play and administrative features. Traditionally, the processor of a gaming machine operates at a relatively constant voltage level and operating frequency. This results in the power consumption of the gaming machine processor being relatively constant while the gaming machine is powered on and operational. A gaming machine in a casino or other host location may be actively being played by a player or may be sitting unused depending on the occupancy of the casino and player interest in the gaming machine. A problem exists in that an unused gaming machine unnecessarily consumes excessive power via its processor at a time when the processor is not performing significant functions. Furthermore, during an intermediate state (e.g. money has been inserted into the gaming machine but gameplay has not yet begun), the processor continues to dissipate excessive power relative to the functions it performs. Moreover, variable power demands of the processor not managed dynamically or automatically via software are inefficient. The embodiments of the invention are directed to solving one or more of these and other problems.

SUMMARY

According to one aspect of various embodiments of the present invention, a gaming machine for conducting a wagering game includes a value input device for receiving a wager and a processor for executing gameplay on the gaming machine. The processor has a plurality of power consumption levels. The gaming machine includes a power regulator operative to alter the power consumption level of the processor amongst the plurality of power consumption levels.

According to another aspect of various embodiments of the invention, a method of conducting a wagering game on a gaming machine comprises maintaining a first power consumption level of a processor of the gaming machine, the processor for executing gameplay. The method further comprises receiving a wager from a player of the gaming machine. The method further comprises altering the power consumption level of the processor to a second power consumption level. According to yet another aspect of some embodiments, a computer readable storage medium is encoded with instructions for directing a gaming device to perform the above method.

Additional aspects of the embodiments of the invention will be apparent to those of ordinary skill in the art in view of the detailed description of various embodiments, which is made with reference to the drawings, a brief description of which is provided below.

DETAILED DESCRIPTION

Figure 1:
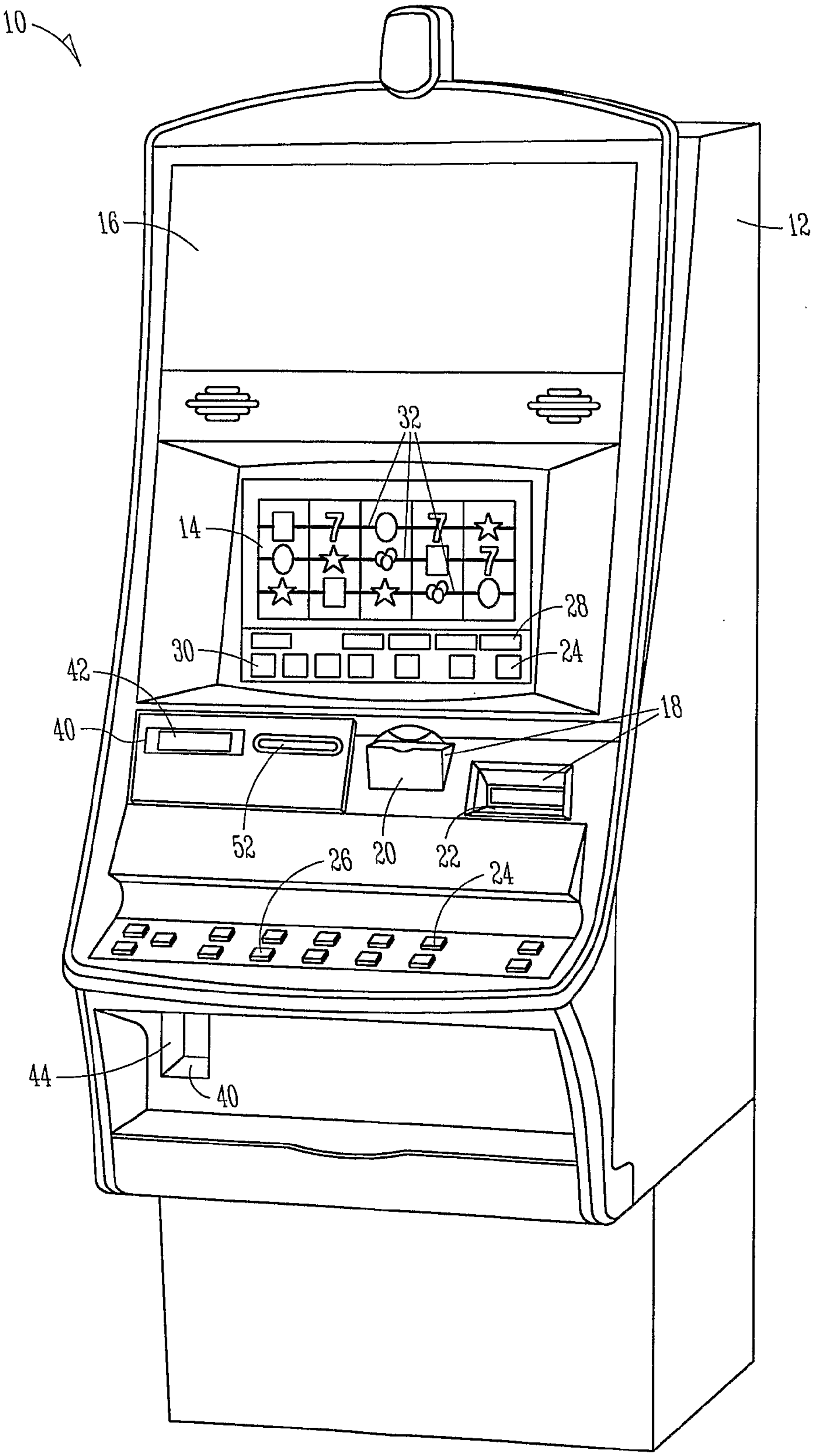
FIG. 1 is a perspective view of a gaming machine incorporating embodiments of the present invention.

While the inventive subject matter is susceptible of embodiment in many different forms, there is shown in the drawings and will herein be described in detail various embodiments of the invention with the understanding that the present disclosure is to be considered as an exemplification of the principles of the embodiments of the present invention and is not intended to limit the broad aspect of the inventive subject matter to the embodiments illustrated.

Referring to FIG. 1, a gaming machine 10 is used in gaming establishments such as casinos. With regard to the various embodiments of the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual associated to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

It should be noted that in some embodiments, the gaming machine 100 may be a portable or handheld gaming machine. In these embodiments, the portable or handheld gaming machine include some or all of user interface elements as described above, however the user interface elements may be scaled, adapted or formatted to fit within the housing of the portable or handheld gaming machine. Such handheld or portable gaming machines may include portable computers, PDAs (Personal Digital Assistants), cellular telephones or any other devices capable of processing a computerized method.

Figure 2:
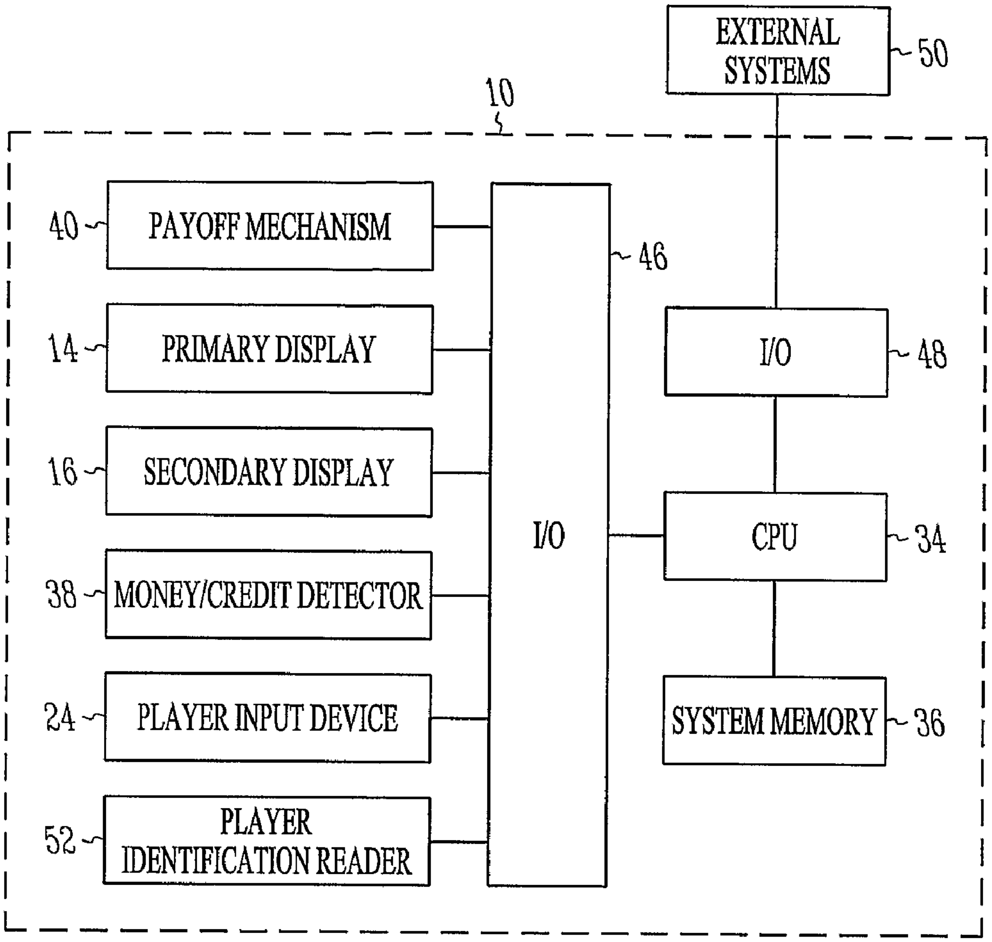
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
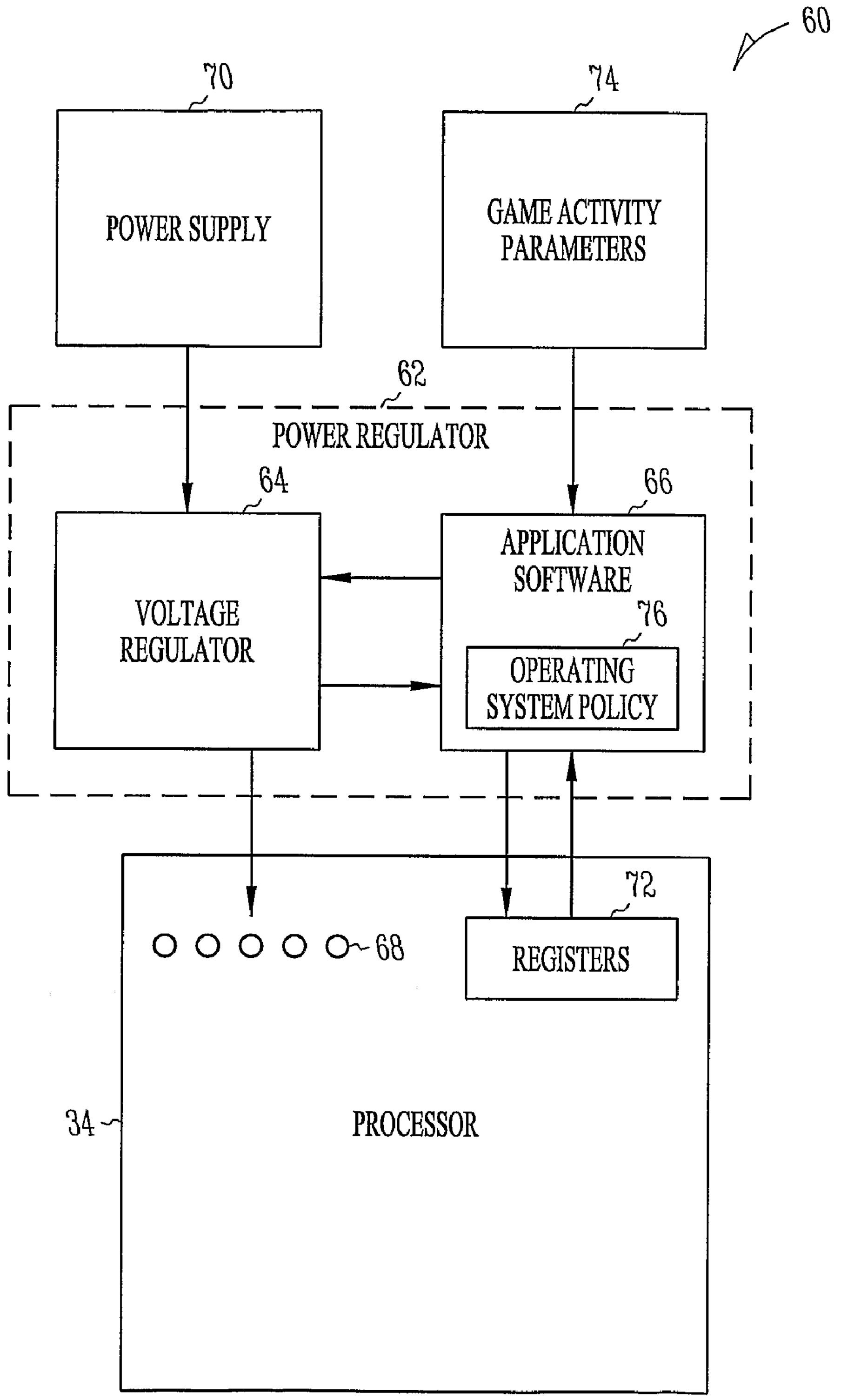
FIG. 3 is a block diagram of a dynamic processor power consumption system according to embodiments of the present invention.

Turning now to FIG. 3, the gaming machine 10 in various embodiments includes a dynamic processor power consumption system 60 which is depicted. The system 60 includes a processor (or CPU) 34, a power regulator 62, and a plurality of game activity parameters 74. The power regulator 62 comprises a voltage regulator 64 and application software 66 stored on system memory 36. The voltage regulator 64 and application software 66 are in communication with one another. The application software 66 may be stored on one or more components of memory which comprise system memory 36.

The power regulator 62 serves to regulate the power consumption of the processor 34 through dynamic control of the operating voltage of the processor 34, the clock frequency of the processor 34, or both. The application software 66 controls the output of voltage regulator 64. This output voltage is in turn provided to a plurality of voltage pins 68 providing operation power to the processor 34, as seen in FIG. 3. The voltage regulator 64 is operable to vary the voltage supplied to the processor 34 by selectively altering the voltage pins receiving a voltage input from a power supply 70 of the gaming machine 10. The power supply 70 may be one of any variety of AC or DC power supplies providing input power to the processor 34 and other operational components of the gaming machine 10. Preferably, the power supply 70 supplies a direct current (DC) input to the voltage regulator 64, which in turn supplies a plurality of DC voltages to the processor 34.

The clock frequency of the processor 34 is altered by writing to a set of registers 72 in the processor 34. Specifically, the application software 66 changes the clock frequency of the processor 34 by writing to the registers 72 which results in a change in clock frequency. The processor 34 includes a plurality of distinct operating frequencies which range from a low frequency mode (LFM) to a high frequency mode (HFM). The low frequency mode is the lowest clock frequency at which the processor 34 is configured to operate while the high frequency mode is the highest clock frequency at which the processor 34 is configured to operate. The processor 34 may also operate at a plurality of intermediate frequency modes.

The power consumption of the processor 34 is a function of both the operating voltage of the processor 34 and the clock frequency of the processor 34. Power consumption is governed by the following equation:

$$P=CV^2F$$

In this equation, P=power, C=Capacitance, V=operating voltage and F=frequency. Thus, a reduction in power consumption can be accomplished by decreasing the operating voltage of the processor 34, decreasing the frequency of the processor 34, or both. Similarly, an increase in power consumption occurs if the operating voltage, the frequency, or both, are increased.

The dynamic power consumption system 60 includes input signals from a plurality of game activity parameters 74. The parameters 74 may include status information as to various components of the gaming machine 10 which impact power consumption of the processor 34. For example, the processor 34 performs relatively fewer functions when the gaming machine 10 is not being played as compared to when a player has inserted money via the value input device 18, and has commenced play of the gaming machine 10. Thus, the parameters 74 may include the state of the value input device 18, as detected by a sensor or other detector. If the parameters 74 indicate that the state of the value input device 18 is empty and no money is inserted in the gaming machine 10, then the status of such parameter 74 is passed along to the application software 66 of the power regulator 62. Other parameters 74 may include whether or not a player tracking card is inserted in the gaming machine 10, whether play has begun through activation of a spin button or other game commencing mechanism, whether a bonus has been achieved, whether a top box of the gaming machine 10 is in play, and whether any other peripherals or devices in communication with the gaming machine 10. It should be understood than a myriad of parameters 74 may be placed in communication with the application software 66 to provide inputs to the power regulator 62 relevant to altering the power consumption of the processor 34. Furthermore, a large variety of sensors, detectors, and/or monitors may be used to monitor the status of the parameters 74 over time.

The application software 66 may further include an operating system policy 76. The operating system policy 76 determines appropriate power usage for the processor 34 based upon at least the inputs received from the game activity parameters 74. The operating system policy 76 comprises a predetermined power management scheme for the processor 34, which is preferably organized into a plurality of power states. Preferably the power states include a low power state, a high power state and a plurality of intermediate power states. Each power state is associated with a power consumption level for the processor 34, including an operating voltage and a clock frequency. For example, the following power states comprise an operating system policy 76 for the gaming machine 10:

TABLE 1

Gaming Machine Power States

| Power State | Voltage | Frequency |
|---|---|---|
| Low | 0.956 V | 600 MHz |
| Medium-Low | 1.164 V | 1.0 GHz |
| Medium-High | 1.276 V | 1.2 GHz |
| High | 1.484 V | 1.6 GHz |

Furthermore, the operating system policy 76 may be configured to associate each power state with a particular state of the gaming machine 10, based upon the game activity parameters 74. In this way, the operating system policy 76 drives the application software 66 to alter the processor 34 from one power state to another, depending on the various parameters 74 of the gaming machine. For example, in Table 1 above, the Low power state may be associated with the gaming machine 10 having no credits or value input, and being in an inactive state. Thus, the application software 66 of the power regulator 62 alters the power consumption of the processor 34 to a relatively low state by reducing the operating voltage to 0.956 Volts and reducing the clock frequency of the processor to 600 MHz.

At a later time, for example when value is input into the machine 10 such that a player has available credits with which to play, the operating system policy 76 may call for a Medium-Low power state. The application software 66 then adjusts the power consumption of the processor 34 accordingly by adjusting the values of Voltage and Frequency in accordance with Table 1. Similarly, a Medium-High power state may be associated with a button press or touch of a touch screen triggering the execution of a game play event on the gaming machine 10. The High power state may be associated with a winning outcome occurring on the gaming machine 10. Moreover, because the gaming machine 10 is configured such that the outcome of a particular play of the gaming machine 10 is predetermined, the altering from one power state to another is more easily accomplished, as the timing of that alteration by the application software 66 is known in advance, and need not be determined after some period of lag time.

It should be understood that the operating system policy 76 shown in Table 1 is only one of many possible policies which could be implemented in the gaming machine 10. Any operating system policy 76 may be employed which causes the power regulator 62 to alter the power consumption of the processor 34 through a plurality of power states based upon some input criteria of the current state of the gaming machine 10, such as the game activity parameters 74. The operating system policy 76 is an optional feature to the power regulator 62, and the power regulator 62 may alternatively be configured manually to alter the power consumption of the processor 34, by manually configuring the application software 66, for example.

Furthermore, it should be understood that the power regulator 62 may comprise numerous software and/or hardware components for regulating the power consumption of the processor 34. Although some components in the embodiments described are shown as being hardware controlled (e.g. the voltage regulator 64), such components may also be effectuated through software, or a combination of software and hardware. Similarly, some components which are described as being software controlled (e.g. frequency altered by writing to set of registers) may be effectuated through an appropriate hardware configuration, or a combination of software and hardware.

The gaming machine 10 in some embodiments of the present invention offers substantial benefits in comparison to traditional gaming machines. The power regulator 62 serves to minimize the power consumption level of the processor 34 when the processor 34 is not in heavy use by the gaming machine 10, and increase the power consumption of the processor 34 when the processor 34 must accomplish more demanding tasks related to execution and display of gameplay. Furthermore, the power regulator's 62 operating system policy 76 serves to automate the altering between various power states in response to inputs from a variety of game activity parameters 74. The power management system 60 reduces the build-up of heat in the gaming machine 10, thereby reducing the complexity of the gaming machine's 10 cooling system. Moreover, the system 60 may reduce the complexity of a ventilation system for a gaming machine 10 operator, such as a casino. This, the operator experiences both direct cost savings through the reduction in energy used by the gaming machine 10, and indirect cost savings through lower cooling requirements for the casino.

Each of these embodiments and obvious variations thereof is contemplated as falling within the scope of the claimed invention, which is set forth in the following claims.

The invention claimed is:

1. A gaming machine comprising:

a value input device for receiving a wager;

at least one processor for executing gameplay for a wagering game; and a power regulator operative to alter the power provided to the at least one processor amongst a plurality of power levels by altering the operating frequency of the at least one processor, the operating voltage of the at least one processor, or both the operating frequency and the voltage, the altering responsive to a change in state of gameplay of the wagering game in progress on the gaming machine, the state of the gameplay including available credits on the gaming machine, a gameplay trigger event, or an outcome event of the gameplay.

2. The gaming machine of claim 1, wherein the power regulator comprises application software stored on a memory device in communication with the at least one processor.

3. The gaming machine of claim 2, wherein the application software writes to a set of registers on the at least one processor.

4. The gaming machine of claim 2, wherein the application software comprises an operating system policy including a plurality of power states, each power state associated with at least one game activity parameters.

5. The gaming machine of claim 4, wherein the plurality of power states include a low power state, a high power state, and at least one intermediate power state.

6. The gaming machine of claim 1, wherein the operating voltage is altered by a voltage regulator in communication with a plurality of voltage pins connected to the at least one processor.

7. A method of conducting a wagering game on a gaming machine, the method comprising:

maintaining a first power consumption level of at least one processor of the gaming machine upon determining the wagering game is being played on the gaming machine, the at least one processor for executing gameplay;

receiving a wager from a player of the gaming machine;

altering the power consumption level of the at least one processor to a second power consumption level by altering the operating frequency of the at least one processor, the operating voltage of the at least one processor, or both the operating frequency and the voltage, the altering based on a change in state of the gameplay of the wagering game being played, the state of the gameplay including available credits on the gaming machine, a gameplay trigger event, or an outcome event of the gameplay.

8. The method of claim 7, wherein the steps of maintaining and altering the power consumption level of the at least one processor are performed by a power regulator.

9. The method of claim 8, wherein the power regulator comprises application software stored on a memory device in communication with the at least one processor.

10. The method of claim 9, wherein the application software includes a plurality of power states comprising an operating system policy.

11. The method of claim 10, wherein each of the power states is associated with at least one game activity parameter monitored by the application software.

12. The method of claim 7, wherein the operating voltage is altered by a voltage regulator in communication with a plurality of voltage pins connected to the at least one processor.

13. The method of claim 7, wherein the first power consumption level represents a lower power state of the gaming machine than the second power consumption level.

14. A non-transitory computer readable storage device with instructions stored thereon, which when executed by at least one processor of a gamine machine, cause the gamine machine to:

maintain a first power consumption level of the least one processor of the gaming machine upon determining a wagering game is being played on the gaming machine;

alter the power consumption level of the at least one processor to a second power consumption level by altering the operating frequency of the at least one processor, the operating voltage of the at least one processor, or both the operating frequency and the voltage, the altering based on a change in state of the gameplay of the wagering game being played, the state of the gameplay including available credits on the gaming machine, a gameplay trigger event, or an outcome event of the gameplay.

* * * * *